Patented Dec. 13, 1949

2,491,253

UNITED STATES PATENT OFFICE 2,491,253

PREPARATION OF NICOTINONITRILE

Moses L. Crossley, Plainfield, Victor L. King and Elmore H. Northey, Bound Brook, and Theodore F. Scholz, Westfield, N. J., assignors to American Cyanamid Company, New York, N. Y., a corporation of Maine No Drawing. Application August 9, 1944, Serial No. 548,790

3 Claims. (Cl. 260—296)

This invention relates to the preparation of pyridine derivatives. More particularly, the invention relates to an improved process of converting 3-bromopyridine to 3-cyanopyridine.

Recently the production of nicotinic acid or its equivalent, nicotinamide, has become of considerable commercial importance because the body can synthesize from these materials one of the components of Vitamin B. Consequently the processes for the production of nicotinic acid and nicotinamide have become of increasing interest.

Since the formula of nicotinic acid is

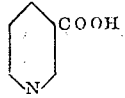

an apparently desirable starting material for its preparation is pyridine which is commercially available in large quantities. However, no satisfactory process adapted for use on a commercially acceptable scale has been available. It is therefore the principal object of the present invention to provide a process whereby nicotinic acid or nicotinamide can be produced from pyridine in large quantities without encountering problems which cannot be handled in plant-scale equipment.

According to the process of the present invention, pyridine is converted to 3-bromopyridine. This may be carried out by any desired process. For example, it may be done by direct bromination, one such process being shown, for example, by Englert and McElvain, 51 J. A. C. S., page 863 (1929). 3-bromopyridine so prepared is then converted to nicotinonitrile (3-cyano pyridine) and the latter can be converted to nicotinic acid by a relatively simple hydrolysis.

More specifically, 3-bromopyridine is placed in a vessel in which reflux conditions can be maintained. A slight molecular excess of copper cyanide is then added and the reaction allowed to go to completion. The addition of even a small amount of copper cyanide, however, causes spontaneous heating. Therefore, the addition of the copper salt is carried out sufficiently slowly to just maintain the reactants at the boiling point, but not sufficiently fast to cause violent ebullition. Subsequently, heating is carried on for sufficient time to complete the reaction under reflux conditions. Preferably, but not necessarily, the equipment in which the reaction is carried out should be provided with cooling means to slow down the reaction if the latter becomes too violent during the period over which the copper salt is being added.

The reaction between 3-bromopyridine and the metal cyanide produces a metal salt of 3-cyanopyridine. It is not new. It has been proposed in the past to continue after the copper cyanide has been added by fractional distillation to remove the other products, leaving the inorganic metal salts and organic by-products as a residue. Unfortunately, however, within a short space of time, often less than one minute, the residue sets up to a hard glassy solid which it is substantially impossible to remove from the reaction vessel.

According to the process of the present invention the reaction mixture immediately after reflux has stopped is slowly poured into a large excess of water, preferably highly agitated. Pouring is done slowly and if the last part of the residue becomes too cool before it is poured, it can be softened by gentle warming. This results in the production of a large number of small glassy pellets which are easily ground when wet.

The ground slurry of the copper complex is then treated to break up the copper compound. This can be done in any desired manner. A preferable manner is by the addition, while stirring, of the requisite amount of a sodium sulfhydrate solution. It can also be done by other methods as by using aqueous sodium sulfide, hydrogen sulfide, sodium cyanide or by bubbling hydrogen sulfide gas through the slurry, the reaction being complete when all the nicotinonitrile is in solution in the water. Excess of these reagents over that required to combine with the copper is to be avoided because any excess reagent reacts with nitrile.

Final isolation of the nicotinonitrile is carried out by filtering off the copper sludge, making the filtrate alkaline, and adding sufficient sodium chloride to precipitate the nicotinonitrile. The latter is then extracted with a suitable solvent such as benzene, dried and finally subjected to fractional distillation to remove the solvent and yield a pure product. Carried out according to the process of the present invention, yields as high as 70-75% of the theoretical, based on the original 3-bromopyridine used, are readily obtained, whereas by previously known methods the yields seldom exceeded 40-45% and then were obtained only with extreme difficulty.

It will be seen, therefore, that the process of the present invention involves six features.

1. Control of the exothermic reaction between cuprous cyanide and bromopyridine by regulated addition of the cyanide;
2. Pouring the reaction product into an excess of rapidly agitated water to produce pellets of the copper complex;
3. Reduction of the copper complex by grinding to a workable slurry;
4. Decomposition of the copper complex with sodium sulfhydrate or an equivalent operation;
5. The solvent extraction of the desired product; and
6. Purification by vacuum distillation.

The invention will be more fully illustrated in conjunction with the following example which is to be taken as illustrative only and not by way of limitation. All parts are by weight unless otherwise noted.

Example 1

25 mole parts of 3-bromopyridine were charged into a reaction vessel fitted with a condenser and stirring equipment. Heat was provided by means of a fluid bath maintained at 180-185° C. Heating was continued until the bromopyridine began to reflux gently. At this point, 27.5 mole parts of cuprous cyanide were slowly added at a rate just sufficient to maintain the reaction at a rapid boil. Heating and agitating were continued for about ten minutes after all the copper salt had been added, after which it was poured into a large excess of water which was rapidly agitated. In this way only about 1% of the melt remained in the reaction vessel.

Water was decanted from the resultant pellets and the latter wet-ground to a thick, almost dry, paste. This paste was reslurried in a part of the drowning water and the slurry rapidly agitated. At this point the slurry had a pH of 5 to 6.5. A solution of sodium sulfhydrate liquor (33.6% by volume) was slowly added, keeping the temperature at about 24-26° C. by cooling as necessary until the pH of the resultant solution was between 3.5 and 6. About 19 mol parts were required. It should be noted that if all the copper were present in the cuprous state, theoretical requirements would be 13.75 mol parts.

Subsequently, the copper sulfide sludge was filtered off and washed, the washings being added to the mother liquor and the filtrate made alkaline with sodium hydroxide to pH of 9-10 and 40 mol parts of sodium chloride added. This precipitated an oil which rapidly solidified and was taken up in successive small portions of benzene. The benzene extract was dried over anhydrous sodium sulfate. After filtering off the drying agent, the benzene filtrate was fractionally distilled, two cuts being taken, the first up to 98° C. at 33 millimeters and the second up to 104-106° C. at 32 millimeters. Fraction 1 was an oil at room temperature but solidified on cooling in ice water, remelting however, when being returned to room temperature. Fraction 2 was a solid at room temperature. The total yield was 67% of the theory, based on the 3-bromopyridine originally used.

Example 2

100 parts of 3-bromopyridine were heated until they refluxed gently. 63 parts of cuprous cyanide were added slowly enough to prevent excess boiling, but to maintain a continuous reflux. The resultant brown syrupy liquid was heated until reaction was complete and then drowned in a solution comprising sodium cyanide 39 parts, water 159 parts, and ice 159 parts. The precipitated pellets which formed were ground to a homogeneous paste and then treated with an additional 39 parts of sodium cyanide and sufficient drowning liquor to just dissolve. When the solution was complete, sufficient sodium chloride was added to form a saturated solution. The aqueous supernatant solution of free nicotinonitrile was then worked up as in Example 1.

Example 3

Cyanation of 100 parts of 3-bromopyridine was carried out as in Example 2, the syrupy liquid being drowned in 320 parts of rapidly agitated water. After grinding to a paste and being slurried, the copper complex slurry was heated to 50° C. and hydrogen sulfide gas bubbled through until the suspension was fully saturated. The slurry was then cooled to about 15° C. and neutralized with caustic soda and then the copper sulfide removed by filtration. Saturation of the filtrate with sodium chloride liberated the nicotinonitrile which was again worked up by solvent extraction and distillation as in Example 1.

Example 4

Example 3 was repeated up to the point at which the copper complex was slurried. A copper complex in this instance was broken down by the addition of a slight excess of sodium hydroxide while stirring the mixture. The precipitate of inorganic copper compounds was filtered off, the nicotinonitrile salted out, extracted out, and the extract distilled as in the preceding examples.

Example 5

Again the procedure of Example 2 was repeated up to the point of preparing the slurry of the copper complex. The slurry was treated with a slight excess over the theoretical amount of sodium sulfide in aqueous solution and then heated until reaction was complete. Again the aqueous nicotinonitrile solution was clarified by filtration, salted out, extracted with benzene and the benzene extract treated by fractional distillation. Again the product was obtained in good yield.

The technique of converting nicotinonitrile to nicotinic acid or the latter to nicotinamide is relatively simple and does not form a part of the present invention. By way of illustration the nicotinonitrile may be converted to nicotinic acid by refluxing in a solution of alcoholic sodium hydroxide, distilling off the alcohol, taking it up at acid in water, and purifying it by careful reprecipitation.

We claim:
1. In a process for the preparation of a copper bromide-nicotinonitrile complex in particulate form, the steps which consist in heating 3-bromopyridine to about the boiling point thereof; adding cuprous cyanide thereto at a controlled rate just sufficient to maintain the reaction mixture at moderate ebullition until reaction substantially ceases, whereby a hot crude pourable copper bromide-nicotinonitrile complex is formed, and pouring the syrupy reacted mixture into a large volume of substantially neutral water, whereby pellets of said crude complex are formed.

2. A process according to claim 1, wherein the reaction of said 3-bromopyridine with said cuprous cyanide is performed under reflux.

3. A process according to claim 1, wherein said water is agitated.

MOSES L. CROSSLEY.
VICTOR L. KING.
ELMORE H. NORTHEY.
THEODORE F. SCHOLZ.

REFERENCES CITED

The following references are of record in the file of this patent:

FOREIGN PATENTS

| Number | Country | Date |
| --- | --- | --- |
| 488,642 | Great Britain | 1936 |

OTHER REFERENCES

Journal American Chemical Soc., pages 2283–2284, August 1941.